Oct. 5, 1954 E. EBERHARD 2,691,074

AMPLIFIER HAVING FREQUENCY RESPONSIVE VARIABLE GAIN

Filed Aug. 31, 1949

INVENTOR
EVERETT EBERHARD
BY H. L. Newton
ATTORNEY

Patented Oct. 5, 1954 2,691,074

UNITED STATES PATENT OFFICE 2,691,074

AMPLIFIER HAVING FREQUENCY RESPONSIVE VARIABLE GAIN

Everett Eberhard, Haddonfield, N. J., assignor to Radio Corporation of America, a corporation of Delaware Application August 31, 1949, Serial No. 113,286

4 Claims. (Cl. 179—171)

This invention relates generally to amplifiers of the semi-conductor type, and particularly relates to amplifiers of this type having a gain that is a function of frequency such, for example, as band-pass or band-rejection amplifiers.

The three-electrode semi-conductor amplifier is a recent development in the field of electronic amplification which does not require a vacuum tube. This device, which has been termed a "transistor," has been disclosed in a series of three letters to the Physical Review by Bardeen and Brattain, Brattain and Bardeen, and Schockley and Pearson which appear on pages 230 to 233 of the July 15, 1948 issue. The new amplifier includes a block of a semi-conducting material such as silicon or germanium which is provided with two closely adjacent point electrodes called "emitter" and "collector" electrodes in contact with one surface region of the material, and a "base" electrode which provides a large-area, low-resistance contact with another surface region of the semi-conducting material. The semi-conductor amplifier may accordingly be considered a three-terminal network having one terminal common to the input and output circuits. Thus, the amplifier is essentially a four-terminal network which provides under proper operating conditions current amplification as well as voltage amplification.

In accordance with the present invention, it has been found that the gain of a semi-conductor amplifier may be made a function of the frequency of the applied signal. Thus, it is feasible to provide band-pass amplifiers, or band-rejection amplifiers which have substantially no gain within a predetermined frequency range. Furthermore, the gain of the amplifiers may be made to rise or to fall with increasing frequency of the input signal.

It is accordingly the principal object of the present invention to provide novel amplifiers having a gain that is a function of the frequency of the input signal, such as band-pass amplifiers, band-rejection amplifiers, amplifiers having a cut-off at a predetermined frequency or amplifiers having a gain that either rises or falls with increasing frequency.

A further object of the invention is to provide semi-conductor amplifiers having internal feedback thereby to make the gain of such an amplifier a function of the frequency of the input signal.

A semi-conductor amplifier in accordance with the present invention has a reactive impedance element connected to either the emitter electrode or to the base electrode of the amplifier. Thus the reactive impedance element controls the internal feedback of the amplifier. The impedance element may also consist of either a parallel resonant circuit or of a series resonant circuit connected to either the emitter electrode or to the base electrode. Thus, a band-pass amplifier may include a parallel resonant circuit connected with the base electrode or a series resonant circuit connected with the emitter electrode. A band-rejection amplifier may include a parallel resonant circuit connected to the emitter electrode or a series resonant circuit connected to the base electrode. An amplifier having a gain which falls with increasing frequency may include a capacitor connected with the base electrode. Alternatively, the same result may be obtained by connecting an inductor to the emitter electrode. An amplifier having a gain which rises with increasing frequency may include either a capacitor connected with the emitter electrode or an inductor connected with the base electrode. The input signal may be impressed on either the emitter electrode or on the base electrode while the amplified output signal is derived from the collector electrode. By connecting resonant circuits to all three electrodes of the amplifier it is feasible to obtain a sharper pass band or rejection band or to obtain a sharper cut-off at a predetermined frequency.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figures 1, 2, 3, 4, 5, 6, 7, 8, 9, 10, 11, 12, 13, 14, 15, 16, 17:
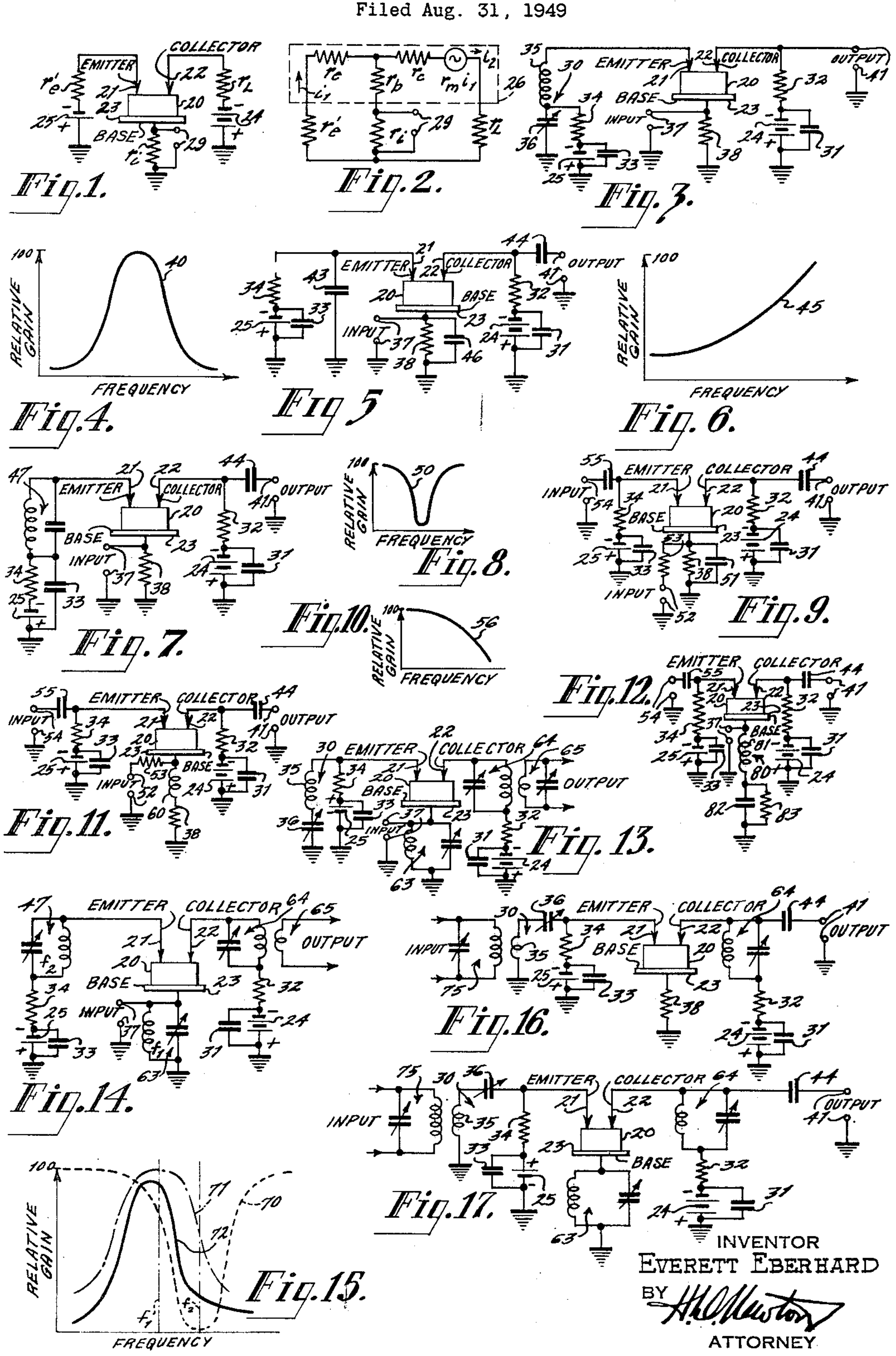
Figure 1 is a schematic circuit diagram of a semi-conductor amplifier provided with external impedance elements which will be referred to in explaining the present invention.
Figure 2 is an equivalent network representing the amplifier of Figure 1.
Figure 3 is a band-pass amplifier embodying the present invention and having a series resonant circuit connected to the emitter electrode.
Figure 4 is a graph illustrating the gain of the amplifier of Figure 3 as a function of frequency.
Figure 5 is an amplifier in accordance with the invention, having a gain that rises with frequency due to a capacitor connected to its emitter electrode.
Figure 6 is a graph illustrating the relative gain of the amplifier of Figure 5 as a function of frequency.
Figure 7 is a band-rejection amplifier in accordance with the invention having a parallel resonant circuit connected to the emitter electrode.
Figure 8 is a graph illustrating the relative gain of the amplifier of Figure 7 as a function of frequency.
Figure 9 is a modified amplifier of the invention having a gain that falls with increasing frequency due to a capacitor connected to its base electrode.
Figure 10 is a graph illustrating the relative gain of the amplifier of Figure 9 as a function of frequency.
Figure 11 is a circuit diagram of an amplifier in accordance with the invention having a gain that rises with frequency due to an inductor connected to its base electrode.
Figure 12 is a circuit diagram of a modified band-rejection amplifier in accordance with the invention.
Figure 13 is a circuit diagram of a band-pass amplifier embodying the present invention and having tuned circuits connected to all of its electrodes, the input signal being impressed on the base electrode.
Figure 14 is a circuit diagram of a modified band-pass amplifier in accordance with the invention having a sharper cut-off due to the provision of individual parallel resonant circuits connected to the emitter and base electrodes.
Figure 15 is a graph illustrating the relative gain of the amplifier of Figure 14 as a function of frequency.
Figure 16 is a circuit diagram of a band-pass amplifier having a series resonant circuit connected to the emitter electrode to which the input signal is impressed.
Figure 17 is a circuit diagram of a modification of the amplifier of Figure 16 embodying the present invention and having a sharper pass band than the amplifier of Figure 16.

Referring now to the drawing, in which like components have been designated by the same reference numerals throughout the figures, and particularly to Figure 1, there is illustrated a semi-conductor amplifier. The amplifier comprises body 20 of semi-conducting material which may consist, for example, of boron, silicon, germanium, tellurium or selenium containing a small but sufficient number of atomic impurity centers or lattice imperfections as commonly employed for best results in crystal rectifiers. Germanium is the preferred material for body 20 and may be prepared so as to be an electronic N type semi-conductor, as is well known. The surface of semi-conducting body 20 may, for example, be polished and etched in the manner explained in the paper by Bardeen and Brattain referred to. It is also feasible to utilize the germanium block from a commercial high-back-voltage germanium rectifier such as the type 1N34 in which case further surface treatment may not be required.

Semi-conducting body 20 is provided with emitter electrode 21, collector electrode 22 and base electrode 23. Emitter electrode 21 and collector electrode 22 are small-area electrodes and may be point contacts consisting, for example, of tungsten or Phosphor bronze wires having a diameter of the order of 2 to 5 mils. Emitter and collector electrodes 21, 22 are ordinarily placed closely adjacent to each other either on the same surface of body 20 or on opposite surfaces thereof and they may be separated by a distance of from 2 to 5 mils. Base electrode 23 provides a large-area low-resistance contact, that is, a non-rectifying contact with the bulk material of semi-conducting body 20.

Separate resistors are provided in the leads of each of the three electrodes. Thus, base resistor $r_i$ is arranged between base electrode 23 and ground. Collector resistor $r_L$ is provided between collector electrode 22 and battery 24 while emitter resistor $r_{e'}$ is connected between emitter electrode 21 and battery 25. Battery 24 is provided between ground and collector electrode 22 for the purpose of applying a relatively large reverse bias between collector electrode 22 and base electrode 23. Battery 25 connected between ground and emitter electrode 21 applies normally a small forward bias between emitter electrode 21 and base electrode 23. It is believed that the operation of the circuit of Figure 1 is sufficiently well understood so as not to require further explanation here. For further explanatory material regarding the operation of a semi-conductor amplifier, reference is made to the recent paper by Webster, Eberhard and Barton which appears on pages 5 to 16 of the March 1949 issue of RCA Review.

Figure 2 illustrates an alternating-current equivalent circuit of the amplifier of Figure 1, the equivalent network being described on page 9 (Figure 4) of the paper by Webster, Eberhard and Barton referred to. In the circuit of Figure 2, dotted box 26 indicates semi-conducting body 20 which may be considered as including resistor $r_b$ which appears looking into base electrode 23 between the electrode and ground, resistor $r_e$ appearing looking into emitter electrode 21 between the electrode and ground; and resistor $r_c$ which appears looking into collector electrode 22 between the collector and ground. In series with resistor $r_c$ and $r_L$ there is provided an impedanceless generator labeled $r_m i_1$, where $i_1$ is the current flowing into the emitter electrode as indicated in Figure 2. $i_2$ is the alternating current flowing from the collector electrode 22.

Let it be assumed that the input signal is applied between base electrode 23 and ground while the output signal is derived between collector electrode 22 and ground. For this condition, a mathematical analysis of the circuits of Figures 1 and 2 may be carried out. Thus, it follows that the input impedance looking into terminals 29 will approach $r_i$ when the following condition is met:

$$r_m - r_E = r_L + r_c \qquad (1)$$

where $r_E = r_e + r_{e'}$. The remaining symbols occurring in Formula 1 are indicated in Figure 2. This is simply the condition of $i_1 = i_2$ in Figure 2.

Under these operating conditions the voltage gain G is given by the following formula:

$$G = r_L / r_E \qquad (2)$$

Similarly, the power gain P is given as follows:

$$P = \frac{r_i}{r_E} \frac{r_L}{r_E} \qquad (3)$$

It will now be seen that the voltage gain is inversely proportional to the external emitter resistance $r_e$, the power gain is inversely proportioned to the square of the external emitter impedance $r_{e'}$ if $r_{e'}$ is large compared to $r_e$. Furthermore, the power gain is directly proportional to the external base impedance $r_i$.

The voltage and power gain of the amplifier will increase over its normal gain where $i_1 = i_2$;

when the left hand term of Formula 1 becomes greater than the right hand term. However, the practical gain is limited because when the point of oscillation is reached, the device will no longer amplify. It can be shown that with $i_1=i_2$ the point of oscillation will occur when $r_1$ approaches infinity. Then as $r_1$ is made larger, the condition of $i_1=i_2$ approaches the condition for oscillation.

While the above mathematical treatment applies particularly to an amplifier where the input signal is impressed on the base electrode, somewhat similar conditions exist when the input signal is impressed on the emitter electrode. Consider the circuit of Figure 2 wherein $r_{e'}$ is replaced by a voltage generator having a variable voltage $e_1$ in series with a resistor $R_e$. An analysis of this circuit has been carried out giving the following results. The condition of $i_1=i_2$ is reached when:

$$r_c+r_L=r_m \quad (4)$$

Under these operating conditions the voltage ratio $$\frac{e_0}{e_1}=\frac{r_L}{R_e+r_e} \quad (5)$$

where $e_0$ is the voltage developed across $r_L$.

Under the above conditions it can again be shown that the point of oscillation approaches the point where $i_1=i_2$ as $r_1$ increases. This indicates that for $i_2>i_1$ the power gain varies directly with $r_1$. However, when $i_1=i_2$, the gain is not a function of $r_1$.

It will readily be apparent from Equation 3 that the gain of the amplifier (with input between base electrode 23 and ground) of Figure 1 can be controlled if a frequency-dependent impedance element is connected to the emitter electrode 21. Such an element will control the internal feedback of the amplifier which is determined by the external impedance in the base and in the emitter leads. An amplifier having a series resonant circuit 30 connected between emitter electrode 21 and ground is illustrated in Figure 3. At the resonant frequency of series resonant circuit 30 its impedance approaches zero and accordingly the gain of the amplifier of Figure 3 at that frequency is a maximum. As the frequency of the input signal deviates from the resonant frequency of circuit 30 the gain will decrease. Accordingly, the amplifier of Figure 3 functions as a band-pass amplifier.

Battery 24 of the amplifier of Figure 3 may be by-passed for signal frequencies by capacitor 31 and may be connected to collector electrode 22 through load resistor 32. Battery 25 is similarly bypassed by capacitor 33 for signal frequencies and may be connected to emitter electrode 21 through resistor 34 and inductor 35 of resonant circuit 30. One terminal of capacitor 36 which, together with inductor 35, forms series resonant circuit 30, may be grounded. The input signal may be impressed on input terminals 37 connected across base resistor 38 which may be grounded as shown.

Figure 4 shows curve 40 representing the relative gain of the amplifier of Figure 3 with respect to frequency. As pointed out hereinabove the gain is a maximum at the resonant frequency of series resonant circuit 30. The amplified output signal may be derived from output terminals 41 connected effectively across load resistor 32.

The input and output impedances of the amplifier of Figure 3 are substantially the same.

Accordingly, two amplifier stages can be connected in cascade without requiring impedance matching networks. In order to provide good stability of the amplifier of Figure 3 the following condition should be fulfilled:

$$\frac{r_M-r_e}{r_L+r_c}$$

should be unity or slightly less and base resistor 38 should be less than 10,000 ohms.

It is also feasible to connect a reactive impedance element to emitter electrode 21. Thus, Figure 5 illustrates capacitor 43 connected between emitter electrode 21 and ground. The input signal to be amplified may again be impressed on input terminals 37 connected across base resistor 38. The output signal may be obtained from output terminals 41 one of which is grounded while the other one is coupled to collector electrode 22 through coupling capacitor 44.

The reactive impedance of a capacitor is proportional to the reciprocal of the frequency at which the impedance is measured. Since the gain of the amplifier is inversely proportional to the external emitter impedance $r_{e'}$ the amplifier of Figure 5 has a gain that rises with increasing frequency as illustrated by curve 45 of Figure 6. This rising gain characteristic may be utilized to compensate the normally falling gain of a semi-conductor amplifier. It may be pointed out that in the circuit of Figure 5 this principle of controlling response is valid only when the signal is impressed on base electrode 23 as illustrated.

The impedance of capacitor 43 should be appreciable at the signal frequency but is low compared to the resistance of resistor 34. It is also feasible to provide capacitor 46 connected in shunt with base resistor 38. Capacitor 46, however, is optional and should have an impedance over the desired band of frequencies that is high compared to the resistance of resistor 38. The purpose of capacitor 46 is to prevent high-frequency oscillations by decreasing the impedance between base electrode 23 and ground at high frequencies.

From the above formulas it will be evident that it is also feasible to connect a parallel resonant circuit such as circuit 47 to emitter electrode 21 as illustrated in Figure 7. Battery 25 and resistor 34 may be connected in series with parallel resonant circuit 47 between emitter electrode 21 and ground. Capacitor 33 may bypass both battery 25 and resistor 34. The input signal is again impressed through input terminals 37 to base resistor 38 while the output signal is obtained from output terminals 41 connected across collector load resistor 32.

The reactive impedance of a parallel resonant circuit approaches infinity at its resonant frequency. Accordingly, as illustrated by curve 50 of Figure 8 the gain of the amplifier of Figure 7 is a minimum at the resonant frequency of parallel resonant circuit 47. The amplifier of Figure 7 accordingly is a band-rejection amplifier. Experiments have shown that a sharp rejection band can be obtained with the amplifier of Figure 7. The input signal in the amplifier of Figure 7 can only be impressed on the base electrode 23 as illustrated.

As has been already pointed out the power gain given by Formula 3 is directly proportional to the external base impedance $r_1$ for a base input amplifier. Thus, the gain of an amplifier can be controlled by providing a capacitor 51 between base electrode 23 and ground as shown in Figure 9. Capacitor 51 may be shunted by base resistor 38 and may have an appreciable impedance for signal frequencies. The input signal may be impressed on input terminals 52, one of which is grounded while the other one is connected to base electrode 23 through series resistor 53. Resistor 53 indicates schematically an impedance provided in series with the source thereby to provide a high impedance input source. It is also feasible to impress the input signal on input terminals 54, one of which is grounded while the other one is coupled to emitter electrode 21 through coupling capacitor 55. This readily follows from the discussion of Formulas 4 and 5. The output signal may be derived from output terminals 41 coupled across load resistor 32.

Since the reactive impedance of the capacitor decreases with frequency and since the gain of the amplifier is directly proportional to the external base impedance $r_1$, the gain of the amplifier of Figure 9 will decrease with an increase of frequency as illustrated by curve 56 of Figure 10. As indicated in Figure 9 the input signal may be impressed on either base electrode 23 or on emitter electrode 21.

An amplifier having a gain which decreases with an increase of frequency as illustrated in Figure 10 may also be obtained if an inductor is connected to the emitter. Thus it is feasible to omit capacitor 36 in the circuit of Figure 3. The falling gain is then determined by inductor 35 connected to emitter electrode 31.

It is also feasible in accordance with the invention to provide an inductor 60 in the base lead as shown in Figure 11. Inductor 60 preferably is connected in series with base resistor 38 between base electrode 23 and ground. The input signal may be impressed on input terminals 52, one of which is grounded while the other one is connected to base electrode 23 through series resistor 53. It is also feasible to impress the input signal on input terminals 54, one of which is coupled to emitter electrode 21.

The reactive impedance of an inductor such as inductor 60 is directly proportional to the frequency. Accordingly, the gain of the amplifier of Figure 11 rises with increasing signal frequency as illustrated by curve 45 of Figure 6. As illustrated in Figure 11 the input signal may be impressed on either base electrode 23 or on emitter electrode 21.

Figure 12 illustrates still another band rejection amplifier in accordance with the invention. The amplifier of Figure 12 has an output resistor 32 connected between battery 24 and collector electrode 22. Resistor 34 is connected between emitter electrode 21 and battery 25. In accordance with the present invention, series resonant circuit 80 is connected between base electrode 23 and ground. Circuit 80 comprises inductor 81 and capacitor 82 which is bypassed by resistor 83 to provide a direct current path between base electrode 23 and ground. In view of the fact that the external base lead includes considerable resistance, battery 25 should be so poled that its negative terminal is connected to emitter electrode 21.

The amplifier of Figure 12 is a band rejection amplifier having a response curve such as shown at 50 in Figure 8. The operation of the amplifier of Figure 12 follows from Formula 3 provided the input signal is impressed on input terminals 37 connected between base electrode 23 and ground. In this case, $r_1$ approaches zero for frequencies within the rejection band. The output signal may be obtained from output terminals 41.

It is also feasible to impress the input signal on input terminals 54, one of which is coupled to emitter electrode 21 through coupling capacitor 55. The mode of operation of the amplifier with emitter input readily follows from Formulas 4, 5 and the subsequent discussion. It should be pointed out, however, that the amplier should be operated so that $i_2 > i_1$.

A modified band-pass amplifier in accordance with the invention which is similar to that of Figure 3, is illustrated in Figure 13. Thus, series resonant circuit 30 may be connected between emitter electrode 21 and ground. Battery 25 and emitter resistor 34 may be connected in parallel with series resonant circuit 30. A parallel resonant circuit 63 is connected between base electrode 23 and ground. Parallel resonant circuit 64 may be connected between collector electrode 22 and collector resistor 32 and battery 24 connected in series. The input signal may be impressed on input terminals 37 connected across parallel resonant circuit 63. The amplified output signal may be obtained from resonant circuit 65 inductively coupled to resonant circuit 64.

The output impedance of the amplifier should be large such as the impedance of parallel resonant circuits 64 and 65. When all three resonant circuits 30, 63 and 64 are tuned to the same frequency a very selective pass band may be obtained. Thus, when the three resonant circuits are tuned to 455 kc. (kilocycles) a gain curve (Figure 4) 4 kc. wide was measured at the half power points.

The amplifier of Figure 13 functions as a band-pass amplifier having a sharper cut-off on both sides of the resonant frequency of circuits 30, 63 and 64 than the amplifier of Figure 3. This is due to the fact that the three tuned circuits provide a sharper rejection at both sides of the pass band.

The amplifier of Figure 14 is a band-pass amplifier having a very sharp cut-off at a predetermined frequency which is at one side of the pass band. To this end, parallel resonant circuit 47 is connected between emitter electrode 21 and resistor 34 and battery 25 connected in series. Another parallel resonant circuit 63 is connected between base electrode 23 and ground. The input signal may be impressed on input terminals 37 connected across parallel resonant circuit 63. The output signal may be developed in parallel circuit 64 connected in series between collector electrode 22 and battery 24. The amplified output signal may be obtained from output circuit 65 inductively coupled to resonant circuit 64.

The operation of the amplifier of Figure 14 may best be understood by reference to Figure 15. Thus, curve 70 shown in dotted lines indicates the gain of the amplifier if circuit 63 were omitted. Curve 70 corresponds to curve 50 of Figure 8 which indicates a band rejection amplifier. Dot and dash curve 71 of Figure 15 indicates the gain of the amplifier due to parallel resonant circuit 63. If resonant circuits 63 and 47 are tuned respectively to frequencies $f_1$ and $f_2$ as indicated in Figures 14 and 15, the resultant gain is shown by curve 72 in full lines. Accordingly, a very sharp cut-off is obtained at one side of the pass band between frequencies $f_1$ and $f_2$, that is, between the frequencies to which circuits 63 and 47 are tuned. Resonant circuit 64 should be tuned to the frequency $f_1$ to which resonant circuit 63 is tuned.

It follows from Equation 5 that it is also feasible to impress the input signal on emitter electrode 21 in a band-pass amplifier of the type illustrated in Figure 3. Such band pass amplifiers are shown in Figures 16 and 17. In this case, a low impedance driving source is required but a very high power gain may be realized. The input signal in the amplifier of Figure 16 may be impressed on parallel resonant circuit 75 which is loosely coupled to coil 35 forming part of series resonant circuit 30 connected between emitter electrode 21 and ground. Battery 25 and resistor 34 may be connected in shunt with series resonant circuit 30. As shown in Figure 16 a base impedance element such as resistor 38 may be required. The output signal may be developed in parallel resonant circuit 64 connected between collector electrode 22 and resistor 32 and battery 24. The output signal may be obtained from output terminals 41. As illustrated in Figure 17 the base impedance element may also consist of parallel resonant circuit 63. If the three resonant circuits 30, 63 and 64 are tuned to the same frequency a very high selectivity may be obtained. The band-pass amplifier of Figure 17 otherwise functions like that of Figure 16.

There have thus been disclosed semi-conductor amplifiers having a gain that is a function of the frequency of the input signal. The amplifiers may be arranged to have band-pass or band-rejection characteristics. Furthermore, amplifiers may be provided which have a gain that either rises or falls with increasing frequency of the input signal. The input signal may be impressed on the base electrode or in some cases on the emitter electrode while the amplified output signal is derived from the collector electrode. A band-pass amplifier has also been disclosed having a very sharp rejection at a predetermined side of the pass band.

What is claimed is:

1. A semi-conductor amplifier including a semi-conducting device having a semi-conducting body, an emitter electrode, a collector electrode and a base electrode in contact with said body, said emitter and base electrodes being the input electrodes, said collector electrode and one of the other electrodes being the output electrodes of said amplifier, said device having a ratio of short-circuit collector current increments to emitter current increments which, under proper operating conditions, does not substantially exceed unity, means establishing said operating conditions including a source of potential for applying energizing potentials to all of said electrodes, a first parallel resonant circuit coupled between said input electrodes for applying an input signal thereto, a second parallel resonant circuit connected between said output electrodes for deriving an output signal from said output electrodes, and a series resonant circuit connected between said emitter electrode and said first parallel resonant circuit to render the gain of said amplifier a function of the frequency of said input signal.

2. A semi-conductor amplifier including a semi-conducting device having a semi-conducting body, an emitter electrode, a collector electrode and a base electrode in contact with said body, said emitter and base electrodes being the input electrodes, said collector electrode and one of the other electrodes being the output electrodes of said amplifier, said device having a ratio of short-circuit collector current increments to emitter current increments which, under proper operating conditions, does not substantially exceed unity, means establishing said operating conditions including a source of potential for applying energizing potentials to all of said electrodes, means including a parallel resonant circuit connected between said input electrodes for applying an input signal to said input electrodes, means including a first resonant circuit coupled between said output electrodes for deriving an output signal from said output electrodes, and a second resonant circuit connected between said emitter electrode and said parallel resonant circuit, said parallel resonant circuit thereby presenting an appreciable impedance to said input signal, whereby the power gain P of said amplifier is determined in accordance with the formula $$P=\frac{r_i}{r_E}\frac{r_L}{r_E}$$

where $r_i$ is the external base impedance, and $r_L$ is the external collector impedance and $r_E$ is the sum of the external emitter impedance and the internal emitter resistance, so that said power gain is a function of the effective impedance which said parallel resonant circuit presents to said input signal.

3. A semi-conductor amplifier including a semi-conducting device having a semi-conducting body, an emitter electrode, a collector electrode and a base electrode in contact with said body, said emitter and base electrodes being the input electrodes, said collector electrode and one of the other electrodes being the output electrodes of said amplifier, said device having a ratio of short-circuit collector current increments to emitter current increments which, under proper operating conditions, does not substantially exceed unity, means establishing said operating conditions including a source of potential for applying energizing potentials to all of said electrodes, means including a parallel resonant circuit connected between said base electrode and a point of fixed reference potential for applying an input signal to said input electrodes, means including a resonant circuit connected between said collector electrode and said point of fixed reference potential for deriving an output signal from said output electrodes, and a series resonant circuit connected between said emitter electrode and said point of fixed reference potential, whereby the power gain P of said amplifier is determined in accordance with the formula $$P=\frac{r_i}{r_E}\frac{r_L}{r_E}$$

where $r_i$ is the external base impedance, $r_L$ is the external collector impedance and $r_E$ is the sum of the external emitter impedance and the internal emitter resistance, so that said power gain is a function of the effective impedance which said series resonant circuit presents to said input signal.

4. A band pass amplifier comprising a semi-conductor device including a semi-conductor body, a base electrode and an emitter electrode and a collector electrode in contact with said body, said device having a ratio of short-circuit collector current increments to emitter current increments which, under proper operating conditions, does not substantially exceed unity, means establishing said operating conditions including a source of potential for applying energizing potentials to said electrodes, a series resonant circuit connected between said emitter electrode and a point of fixed reference potential, a first parallel resonant circuit connected between said collector electrode and said point of fixed reference potential, a second parallel resonant circuit connected between said base electrode and said point of fixed reference potential, said resonant circuits being tuned to the same frequency, means for impressing an input signal on said second parallel resonant circuit, and means for deriving an amplified output signal from said first parallel resonant circuit.

References Cited in the file of this patent

UNITED STATES PATENTS

| Number | Name | Date |
|---|---|---|
| 2,351,934 | Kramolin | June 20, 1944 |
| 2,476,323 | Rack | July 19, 1949 |
| 2,486,776 | Barney | Nov. 1, 1949 |
| 2,524,035 | Bardeen et al. | Oct. 3, 1950 |
| 2,541,322 | Barney | Feb. 13, 1951 |
| 2,550,518 | Barney | Apr. 24, 1951 |
| 2,556,286 | Meacham | June 12, 1951 |
| 2,647,957 | Mallinckrodt | Aug. 4, 1953 |
| 2,647,958 | Barney | Aug. 4, 1953 |

OTHER REFERENCES

Article by Atkins in "Radio and Television News," October 1948, pp. 39, 181, 182, 183, 184. Copy in 179-171-MB.